C. M. CONRADSON.
AUTOMATIC CHUCK FOR LATHES.
APPLICATION FILED MAY 14, 1914.
1,125,479.
Patented Jan. 19, 1915.
3 SHEETS—SHEET 1.
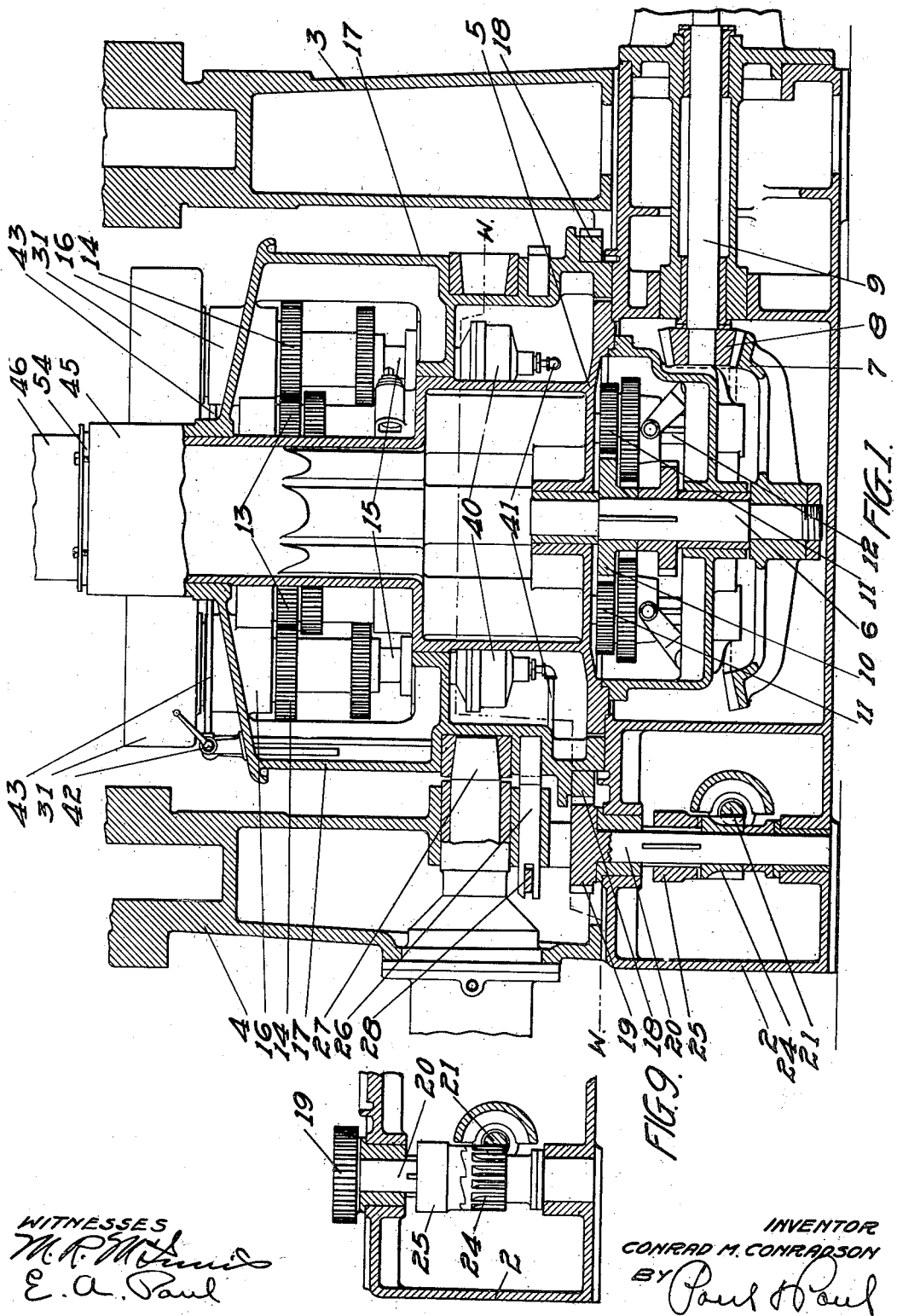
WITNESSES
M. R. M'Sumid
E. A. Paul
INVENTOR
CONRAD M. CONRADSON
BY Paul & Paul
ATTORNEYS

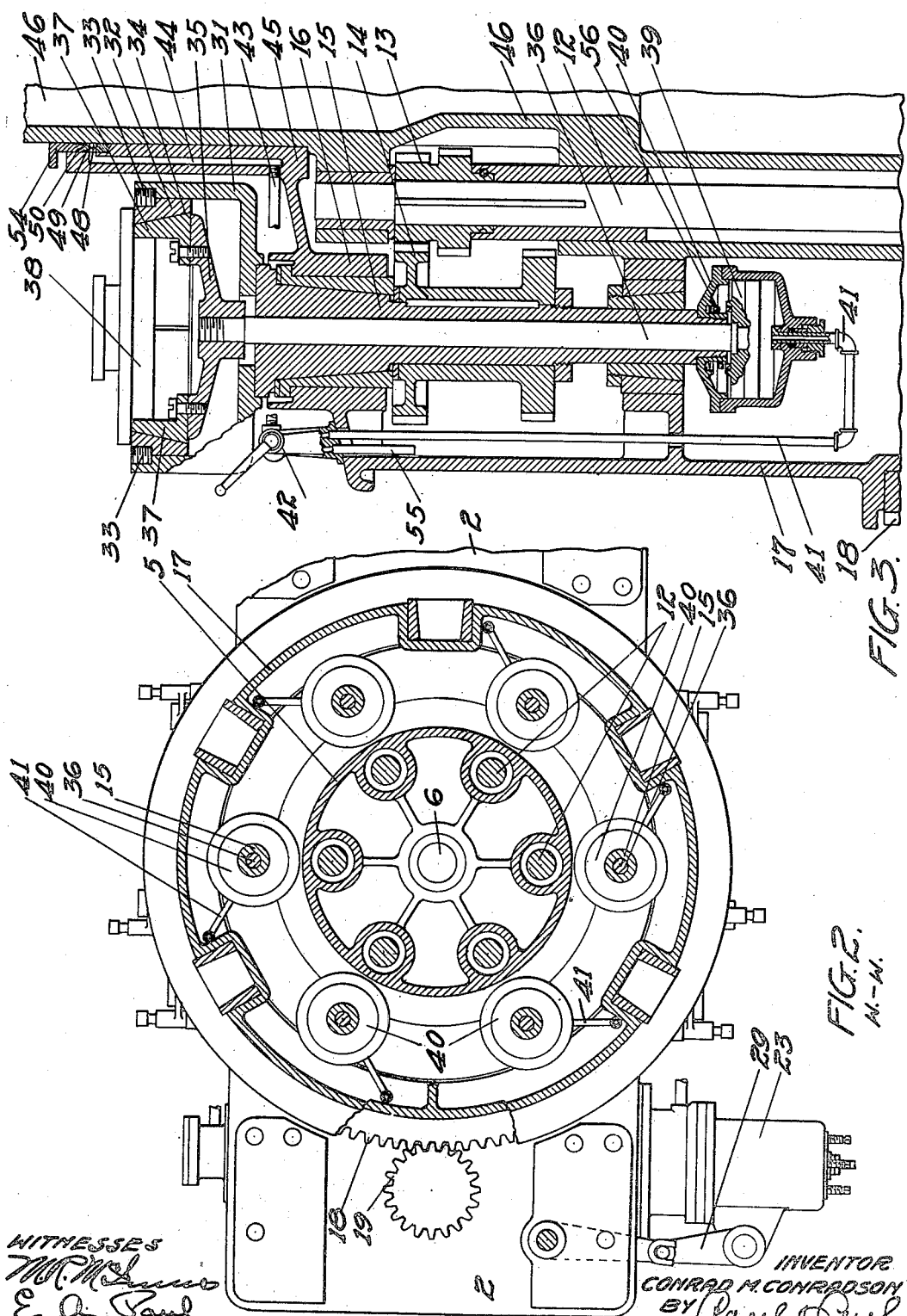

C. M. CONRADSON.
AUTOMATIC CHUCK FOR LATHES.
APPLICATION FILED MAY 14, 1914.
1,125,479.
Patented Jan. 19, 1915.
3 SHEETS—SHEET 3.
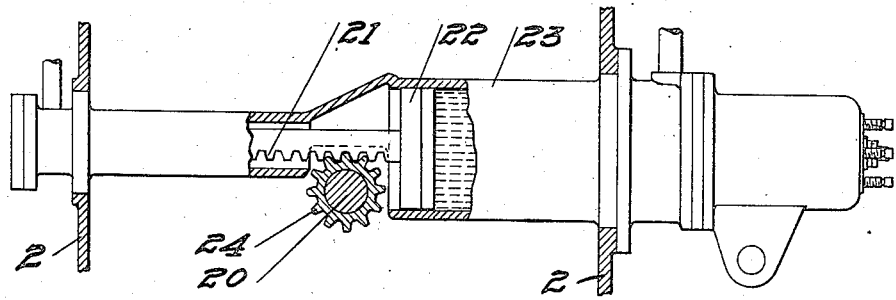
FIG. 8.
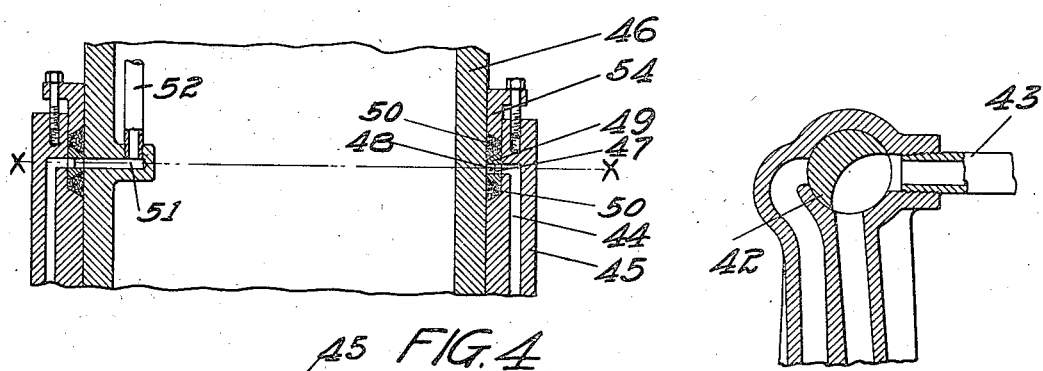
FIG. 4.
FIG. 7.
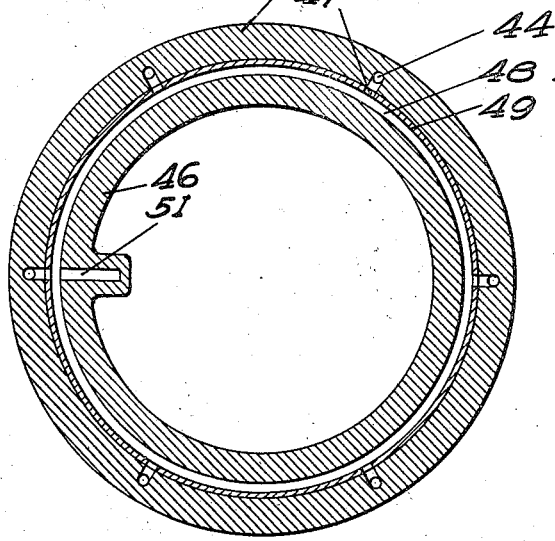
FIG. 5.
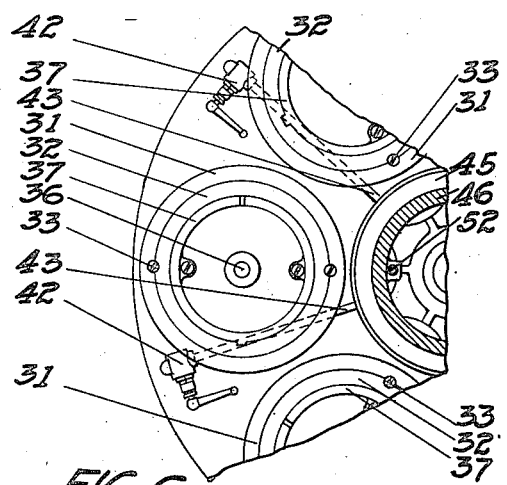
FIG. 6.
WITNESSES
M. P. McInnis
E. A. Paul
INVENTOR
CONRAD M. CONRADSON
BY Paul & Paul
ATTORNEYS

UNITED STATES PATENT OFFICE.

CONRAD M. CONRADSON, OF MADISON, WISCONSIN.

AUTOMATIC CHUCK FOR LATHES.

1,125,479.           Specification of Letters Patent.      Patented Jan. 19, 1915.

Application filed May 14, 1914. Serial No. 838,543.

*To all whom it may concern:*

Be it known that I, CONRAD M. CONRADSON, citizen of the United States, resident of Madison, county of Dane, State of Wisconsin, have invented certain new and useful Improvements in Automatic Chucks for Lathes, of which the following is a specification.

The object of my invention is to provide an automatic chuck for use in connection with a multiple spindle lathe.

A further object is to provide a chuck capable of being opened and closed by power, thereby increasing the capacity of work without fatiguing the workman by dispensing with the usual number of hand operations.

The invention consists generally in various constructions and combinations, all as hereinafter described and particularly pointed out in the claims.

In the accompanying drawings forming part of this specification. Figure 1 is a vertical sectional view of the lower portion of a multiple spindle lathe embodying my invention. Fig. 2 is a horizontal sectional view, taken on the line w—w of Fig. 1, illustrating the arrangement of the work-supporting spindles. Fig. 3 is a vertical sectional view through one of the spindles and chucks, showing the preferred form of mechanism for opening and closing the chuck, Fig. 4 is a vertical sectional view through a portion of the central standard of the machine, showing the preferred means for delivering the fluid under pressure for operating the chuck, Fig. 5 is a sectional view on the line x—x of Fig. 4, Fig. 6 is a plan section showing the relative arrangement of the chucks and the valves controlling the fluid pressure operating means, Fig. 7 is a detail sectional view of a three-way valve, which controls the admission of fluid pressure to the chuck operating cylinder, Fig. 8 is a detail sectional view, illustrating the means by which a step by step movement is imparted to the work carrier, Fig. 9 is a detail sectional view, showing the clutch mechanism, whereby the movement of the carrier is rendered intermittent.

In the drawing, 2 represents the base of the machine, having upright standards 3 and 4. A casting 5 is centrally mounted on the base and has a bearing for the upper end of a vertical shaft 6. A gear ring 7 is carried by said shaft and meshes with the pinion 8 of a driving shaft 9, which is revolved continuously by some suitable source of power, not shown. The shaft 6 has driving connections through suitable gears 10 and 11 with upright spindles 12 and these spindles have gears 13 mounted to mesh with gears 14 on a work-carrying spindle 15 having bearings 16 in a revolving work carrier 17. There are preferably six of these spindles 12 and 6 of the spindles 15, though a greater or less number may be provided, if preferred, and the gears connecting these spindles with one another and with the shaft 6 are adapted for adjustment to allow all the work-carrying spindles to be revolved simultaneously or any one of them to be revolved independently of all the others or all the spindles to remain stationary.

The work carrier 17 has an intermittent revolving movement effected preferably through the medium of a ring gear 18 and a pinion 19 mounted on an upright shaft 20. This pinion may be operated by any suitable means, preferably by a rack bar 21 connected with the piston 22 of an inelastic fluid cylinder 23. One member of a clutch 24 has teeth to engage the teeth of the rack bar 21 and is loosely mounted on the shaft 20, while the other member 25 of the clutch is splined on the shaft 20. When, therefore, the collar 23 is turned in one direction, its teeth will engage the teeth of the fixed member of the clutch and revolve the shaft 20 and the pinion 19 to rotate the work carrier, while on the return stroke of the rack bar 21, the teeth of the collar 24 will slip over the teeth of the fixed member of the clutch and no movement of the shaft and pinion will take place. Consequently the movement of the work carrier will be intermittent, or step by step. The stationary period, or while the work carrier is at rest between its movements, is sufficient to allow the operator time to change the work in the chucks and during this period I prefer to have the work carrier positively held by means of the stop device 26 and the locking bolt 27, said stop device positively arresting movement of the work carrier and actuated by a lever 28 connected with an arm 29 of a fluid pressure cylinder 23. This mechanism for operating the work carrier and locking it during its stationary period I make no claim to in this application and hence detail illustration and description is unnecessary. It is sufficient to state that these devices operate automatically to move the work carrier with a uniform step by step movement and positively lock it for a predetermined period at the end of each movement.

In the operation of a machine of this kind, it would obviously be very laborious for the operator to open and close a work-holding chuck by hand each time he wished to insert a piece of work or remove it, the machine being designed to operate quite rapidly and the interval between the steps of the work carrier being comparatively short. I therefore provide a means which will enable the operator to open or close a chuck without loss of time and with comparatively little effort, and I will now proceed to describe in detail the preferred form of mechanism by means of which this automatic movement is effected.

Upon each work-supporting spindle 15 is mounted a chuck 31, to the upper portion of which, on the inside, a ring 32, forming a stationary jaw, is secured by screws 33 or other suitable means. This ring is tapered from the top to the bottom, forming an outwardly flaring jaw surface 34. A spider 35 is mounted on a rod 36 and preferably supports a split ring 37 having an exterior surface to fit the flaring surface of the ring 32 and forming a movable jaw, the pressure of the split ring on the ring 32 operating to squeeze the sections 37 together and clamp any article, such as the work 38, between them. Evidently, the split ring 37 or the movable jaw of the chuck will be closed by upward movement and opened by downward movement and it is only necessary to reciprocate the rod 36 to effect this opening and closing movement. A piston 39 is mounted on the lower end of the rod 36 within a cylinder 40 mounted on the spindle 15 and having a pipe connection 41 with a three-way valve 42 located near the chuck within convenient reach of the operator of the machine. There are as many of these valves as there are chucks and each valve preferably communicates through a pipe 43 with a duct 44 that is formed in the hub 45, having bearings on a central column 46. Each duct communicates through a port 47 with an annular groove 48 formed in a ring 49 that is preferably seated within a recess in the hub and is provided with a suitable packing joint 50. A passage 51 is preferably formed in the column 46 communicating with the annular groove and with a supply pipe 52 leading from a suitable source of fluid under pressure down through the hollow column 46. The annular groove encircling the column conducts this fluid pressure to each of the ducts 44 simultaneously, and through these ducts the fluid is delivered to the controlling valves and the cylinder pistons to enable the operator to open or close either one or all of the chuck jaws, as may be desired. The joint between the hub and the column 46 is preferably formed by means of rings 50, one upon each side of the grooved ring, and a follower ring 54 is mounted to bear on the upper ring and exert sufficient pressure thereon to provide a close, fluid-tight joint between the grooved ring, the hub and the column. The controlling valve also has an exhaust pipe 55 and the upward movement of the cylinder piston is against the tension of a spring 56. Any form of cylinder, single or double-acting, plain or differential, may be employed. Any form of chuck or valve may be used, and the valve may be operated manually or automatically, as desired. The piston may be operated by any suitable elastic fluid, such as air, or a suitable inelastic fluid, such as oil, as preferred. The supply will be maintained under a suitable pressure in the groove ring and will flow from this groove through the ducts to the chuck cylinders to actuate their pistons and when the valves are thrown on the exhaust, the fluid will be discharged through the exhaust passage into the space within the work carrier, where, if oil is used, the bearings will be lubricated and the oil will finally work down through the base of the machine to a suitable drip receptacle. Each work-holding chuck will be equipped in a similar manner and the operator will have absolute and instantaneous control of each work-holding spindle, may release the work therein or lock it, as desired, and use one or all of the work-carrying chucks, as may seem necessary or advisable. The connection between the pipe 41 and the spindle cylinder is packed to allow the cylinder to turn freely with the spindle and independently of the step by step revolving movement of the work carrier.

In various ways the details of construction herein shown and described may be modified and still be within the scope of my invention.

I claim as my invention:

1. The combination, with a central guiding member having a passage communicating with a source of fluid pressure, of a revoluble chuck support having a fluid pressure chamber communicating continuously with said passage, a series of chucks mounted in said support and having fluid pressure conductors leading to said chamber, and means controlling the independent flow of fluid pressure to said chucks.

2. The combination, with a central guiding column having a passage communicating with a source of fluid pressure supply, of a revolving carrier having a fluid pressure chamber communicating continuously with said passage, a plurality of chucks mounted in said carrier and having work-engaging jaws, a fluid pressure actuated mechanism therefor, and fluid pressure conductors leading to said chamber and valves for independently controlling the flow of pressure from said chamber to the actuating mechanism of said jaws.

3. A multiple spindle lathe comprising a revolving work carrier having a step by step movement, a central column, said work carrier having a hub journaled on said column, said hub having an annular fluid pressure chamber formed therein and a packing joint with said column and communicating through the wall of said column with a source of fluid pressure supply, a plurality of work-supporting chucks, fluid pressure operated means for opening and closing said chucks and controlling valves communicating with said fluid pressure chamber and with said fluid pressure operated means for closing said chucks to grip the work or opening them to release it.

4. In a lathe, a revolving work carrier having a step by step movement, a plurality of work-supporting spindles mounted therein, chucks having work-engaging jaws carried by said spindles, said carrier having an annular fluid pressure supply passage therein communicating with a source of fluid under pressure, and a chuck operating means having pipe connections with said passage and controlling valves for said pipe connections.

5. In a lathe, a revolving work carrier having a step by step movement, a plurality of work-supporting spindles mounted therein, chucks having work-engaging jaws carried by said spindles, a column around which said work carrier revolves, a hub mounted on said work carrier and having a bearing on said column, said hub having fluid pressure ducts therein communicating with a source of fluid pressure supply, and a chuck-operating means having pipe connections with said ducts and controlling valves for said pipe connections.

6. In a lathe, a revolving work carrier having a step by step movement and an annular fluid pressure chamber, a guiding member having a bearing for said carrier, and a passage communicating with a source of fluid pressure supply and with said chamber, a plurality of work-supporting spindles mounted in said carrier, chucks mounted on said spindles and having stationary jaws, movable jaws having faces coöperating with said fixed jaws to grip the work in said movable jaws, rods whereon said movable jaws are mounted, pistons for said rods, cylinders carried by said spindles to revolve therewith, fluid pressure pipe connections for said cylinders connected with a source of fluid pressure supply, and valves positioned adjacent to said chucks in said fluid pressure pipe connection for controlling the admission of fluid pressure to said cylinders and the movement of their pistons.

7. The combination, with an upright guiding column, of a revolving chuck support having a bearing on said column and operating in a horizontal plane around the same, said column having a passage communicating with a source of fluid pressure and said support having a chamber communicating continuously with said passage, and fluid pressure conductors leading from said chamber, a plurality of chucks mounted in said support, each having a jaw actuating mechanism communicating respectively with the fluid pressure conductors from said chamber, and means for independently controlling the flow of fluid pressure through said conductors to said jaw actuating mechanism.

8. The combination, with a work carrier and a plurality of chucks mounted therein and a fluid pressure actuated mechanism for operating said chucks, of means having a bearing for said carrier and a passage communicating with a source of fluid pressure supply, said carrier having a part provided with a groove arranged to communicate continuously with said passage as said carrier revolves, said carrier also having independent fluid pressure passages communicating with said groove and with said chuck operating mechanism and controlling valves in said fluid pressure passages.

9. In a multiple spindle lathe, a centrally arranged column, a ring seated thereon and provided with a groove therein, said column having a passage communicating with a source of fluid under pressure and with said groove, a hub having a plurality of ducts and ports leading therefrom into said groove, a revolving work-carrier, a plurality of work-supporting spindles mounted therein, chucks for said spindles having work-clamping jaws, fluid pressure actuated means communicating with the ducts in said hub respectively for opening and closing said jaws to release or grip the work, and valves for controlling the flow of fluid pressure to said operated means.

In witness whereof, I have hereunto set my hand this 9th day of May 1914.

CONRAD M. CONRADSON.

Witnesses:
H. G. EDLUND,
S. REEDER.